No. 781,475. PATENTED JAN. 31, 1905.
W. A. VAN BERKEL.
POT OR VESSEL FOR USE IN COOKING BONED HAMS OR SIMILAR MEATS.
APPLICATION FILED APR. 26, 1904.

Witnesses
C. D. Kesler
James L. Norris, Jr.

Inventor
Wilhelmus A. van Berkel
By James L. Norris.
Atty.

No. 781,475.

Patented January 31, 1905.

UNITED STATES PATENT OFFICE.

WILHELMUS ADRIANUS VAN BERKEL, OF ROTTERDAM, NETHERLANDS.

POT OR VESSEL FOR USE IN COOKING BONED HAMS OR SIMILAR MEATS.

SPECIFICATION forming part of Letters Patent No. 781,475, dated January 31, 1905.

Application filed April 26, 1904. Serial No. 205,046.

*To all whom it may concern:*

Be it known that I, WILHELMUS ADRIANUS VAN BERKEL, manufacturer, a subject of the Queen of the Netherlands, residing at 56 Boezemsingel, Rotterdam, Kingdom of the Netherlands, have invented certain new and useful Improvements in Pots or Vessels for Use in Cooking Boned Hams and Similar Meats, of which the following is a specification.

This invention relates to an improved apparatus for compressing and cooking boned ham and like meat goods from which the bones are removed before the boiling or cooking.

As is well known, in boiling meat generally, and more particularly ham, it is of great importance that the water in which it is boiled shall not penetrate the interior of the meat; otherwise the fine flavor of the meat is spoiled. Hitherto it has been customary to firmly wrap the piece of meat with string, it being necessary to take particular care that the place where the bone was was thoroughly compressed. The work of binding with string is not only heavy, but also consumes a deal of time, as the shape of the piece of meat is usually not suitable for such treatment and the cord or string very easily slips off the sloping surfaces of the same and as a consequence leaves marks in the piece of meat.

Now this invention has for its object to provide an apparatus for compressing the piece of meat during the boiling without previously wrapping the ham with string and which therefore prevents the cooking-water from penetrating the interior of the meat and also has the advantage that the ham does not come in contact with the water and the meat-juices and fat which otherwise are lost are collected and may be utilized. For this object a pot or vessel of suitable form is provided. In this pot or vessel a pressure-plate fits exactly, which plate is pressed on the piece of meat by means of two pressure-screws. The vessel either remains open or is hermetically closed by means of a cover. A vessel is shown in the accompanying drawings as an example of construction of such an apparatus adapted for compressing and boiling boned ham—that is to say, ham from which the bone has been previously removed.

Figure 1:
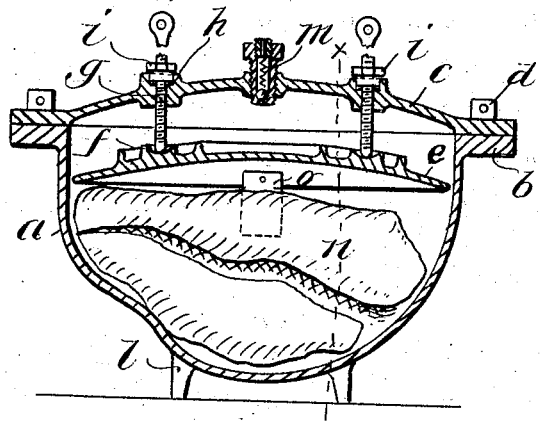
Figure 2:
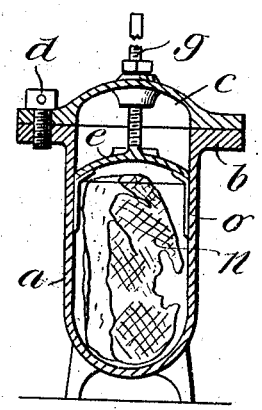
Figure 3:
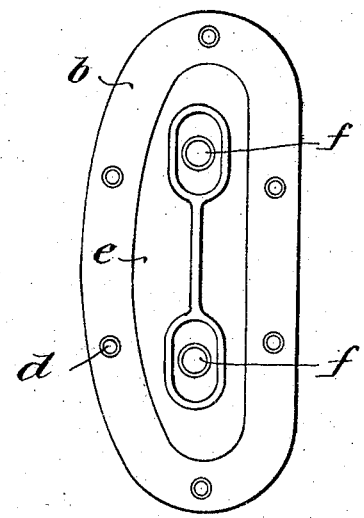

Figure 1 is a longitudinal section; Fig. 2, a cross-section on line $x\,x$, Fig. 1; Fig. 3, a top plan view, and Fig. 4 a sectional view showing the piece of ham in a compressed condition. Fig. 5 is a bridge-fastener for the cover or lid.

The pot or vessel $a$ follows the natural form of a ham $n$, Fig. 1. It is everywhere nicely rounded, Figs. 1 and 2, and has a flat side and a curved side, Fig. 3. A flange $b$ is provided around the top edge, on which a cover $c$ may be fixed by means of screws $d$. Instead of screws $d$ clamp-bolts or other similar fastenings adapted to be easily loosened may be employed. The pressure-plate $e$ is made very strong and concave, with stiffening-ribs, and has two projections $f$, on which projections screws $g$ press, and in order that the pressure-plate shall not tip up lateral guide-strips $o$ may be provided. The cover or lid $c$ is concave. Pressure-screws $g$ are screwed into this lid and secured with lock-nuts $i$. Washer-rings $h$ are laid under these nuts to produce a better joint. A small safety-valve $m$ is provided on the lid or cover, which opens as soon as the pressure in the interior of the pan or pot has reached a certain limit, but which admits no boiling-water into the pot. In order that the pot or pan may be placed straight or upright in the boiler, small feet $l$ are attached to it.

Figure 4:
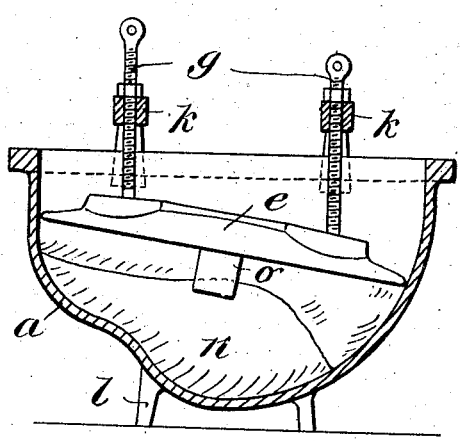
Figure 5:
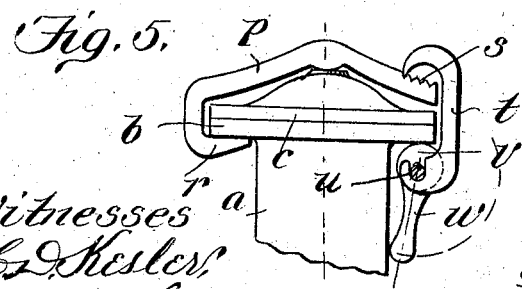

If the pot $a$ is to remain open during the boiling of the ham, the lid or cover $c$ is not used; but two bridge-pieces or yokes $k$ are pushed over the flange $b$, which is then made somewhat narrow, Fig. 4, and in these bridge-pieces the pressure-screws $g$, Fig. 4, are screwed. As to the circumstances under which hams are boiled while the lid of the pot is removed some cooks do not care to preserve all the fat and other substances in the pot and are quite satisfied if the slit of the bone is closed by the pressure-plate, and by cooking in this manner the fat and all these substances are lost in the boiling-water.

In order to dispense with the troublesome and time-consuming operation of turning the screws *d* when closing the pot or pan, the bridge-fastener *p* (shown in Fig. 5) is employed. The end *r* of this bridge-fastener engages under the flange *b* of the pot. In the center it presses on the lid *c*, and its other end is provided with notches *s*. In these notches a hooked connecting-link *t* is placed, the lower end of which is provided with an eccentric clamp-disk *v*. The disk bears against the under part of the flange of the pot or pan and is provided with a handle *w* and is suspended, by means of a pin *u*, in the part *t*. It is evident that by depressing the handle *w* the lid or cover is pressed firmly on the pan.

The mode of using the pot or pan is as follows: The ham *n* is boned and in this condition placed in the pot *a*, Fig. 1, with the lean part toward the flat side of the pot, Figs. 2 and 3. The pressure-plate *e* is then laid on the ham, and if the latter is to be boiled with the pot closed the lid or cover *c* is hermetically secured on the flange *b*. The screws *g* are then screwed down and, in conjunction with the pressure-piece *e*, strongly compress the ham. This pressure-piece adapts itself to the form of the ham, Fig. 4, and thus the latter is fully inclosed and compressed and entirely fills up the pot beneath the pressure-plate. In this condition the pot is placed in the boiler and boiled there as long as necessary. When withdrawn, the pot is reversed—that is to say, with the cover downward—and allowed to cool in this position, the fat and juices of the meat collecting in the hollow of the lid *c* and setting there. The ham *n* retains perfectly the form of the pot when withdrawn and forms a solid boned piece of meat having one flat side. In slicing the ham by hand or with a slicing-machine it is laid on this flat side. The place where the bone was can no longer be seen in a cross-section of the piece. The pots are made in various sizes, right and left, corresponding to the form of hams. In cooking with an open pot the two bridge-pieces *k* may be employed, Fig. 4.

The advantages of this apparatus are as follows: First, the time-consuming and difficult binding of the piece of meat are avoided; second, the meat retains its fine flavor; third, the grease and meat-juices which are separated in a liquid condition from the meat in boiling are not lost in the boiling-water, but retained, and may be made use of.

I declare that what I claim is—

1. A vessel for cooking boned hams and similar meats comprising a lower portion contoured to the shape of the meat to be cooked, a lid mounted upon said lower portion and suitably connected thereto, a pressure-plate operating within said lower portion, and means extending through said lid and engaging said pressure-plate for forcing it onto the meat for compressing, retaining and excluding water from the meat during treatment.

2. A vessel for cooking boned hams and similar meats comprising a lower portion contoured to the shape of the meat to be cooked, a lid mounted upon said lower portion and suitably connected thereto, a pressure-plate operating within said lower portion, means extending through said lid and engaging said pressure-plate for forcing it onto the meat for compressing, retaining and excluding water from the meat during treatment, and a safety-valve carried by the lid.

3. A vessel for cooking boned hams and similar meats comprising a lower portion contoured to the shape of the meat to be cooked, a lid mounted upon said lower portion and suitably connected thereto, a concaved pressure-plate operating within said lower portion, and means extending through said lid and engaging said concaved pressure-plate for forcing it onto the meat for compressing, retaining and excluding water from the meat during treatment.

4. A vessel for cooking boned hams and similar meats comprising a lower portion contoured to the shape of the meat to be cooked, a lid mounted upon said lower portion and suitably connected thereto, a concaved pressure-plate operating within said lower portion, means extending through said lid and engaging said concaved pressure-plate for forcing it onto the meat for compressing, retaining and excluding water from the meat during treatment, and a safety-valve carried by the lid.

5. A vessel for cooking boned hams and similar meats having its lower portion formed with flattened sides, substantially segment-shaped ends and its bottom upon a compound curve, a pressure-plate operating within said lower portion, a lid, means for securing the lid in position, and means extending through the lid and engaging with the pressure-plate for adjusting it.

6. An apparatus for cooking boned hams, comprising a vessel having a curved and a flat side, said sides merging into one another at the ends and bottom, said vessel having an interior convex surface to one side of the transverse center line thereof, a pressure-plate adapted to fit within said vessel, and means for clamping said pressure-plate within said vessel.

7. An apparatus for cooking boned hams, comprising a vessel having a curved and a flat side, curved ends and a curved bottom, said sides, ends and bottom merging into one another, said vessel further having an interior convex surface near the lower part of one end thereof, a pressure-plate adapted to fit within said vessel, and means adapted to clamp said pressure-plate within the vessel.

8. An apparatus for cooking boned hams, comprising a vessel having a curved and a flat side, said sides merging into one another at the ends and bottom, said vessel having an interior convex surface to one side of the transverse center line thereof, a pressure-plate adapted to fit within said vessel, a cover for said vessel, means adapted to detachably secure said cover to the vessel, and clamping means adapted to compress said pressure-plate within the vessel.

9. An apparatus for cooking meats, comprising a vessel having a curved and a substantially flat side, said sides merging into each other at the ends and bottom in a curved manner, said vessel having an interior convex surface to one side of the transverse center line thereof, a cover for said vessel having a non-return valve to permit the exit of steam from the vessel, means for detachably securing said cover to the vessel, a pressure-plate adapted to fit within the vessel, and means adapted when operated to move said pressure-plate toward the bottom of the vessel.

10. An apparatus for cooking boned hams, comprising a vessel having a curved and a substantially flat side, said sides merging into one another at the ends and bottom, said vessel having an interior convex surface to one side of the transverse center line thereof, a concave pressure-plate adapted to fit within the receptacle and provided on its edge with downwardly-extending strips, said strips adapted to extend between the wall of the vessel and the article to be cooked to prevent tipping of said pressure-plate, and means adapted to compress the pressure-plate toward the bottom of the vessel.

In testimony whereof I have hereunto set my hand in presence of two subscribing witnesses.

WILHELMUS ADRIANUS VAN BERKEL.

Witnesses:
WILLEM JACOBUS DE GRAAF,
AIRE H. VOORWINDEN.